United States Patent

[11] 3,553,365

[72] Inventor Edmund Jauernik
Goddelau, Germany
[21] Appl. No. 707,807
[22] Filed Feb. 23, 1968
[45] Patented Jan. 5, 1971
[73] Assignee Fernseh G. m. b. H.
Darmstadt, Germany
[32] Priority Feb. 25, 1967
[33] Germany
[31] No. F51639

[54] ARRANGEMENT FOR DERIVING NOISE-FREE SYNCHRONIZING INFORMATION FROM THE SYNC SIGNAL OF A TELEVISION SIGNAL
2 Claims, 4 Drawing Figs.

[52] U.S. Cl. ........ 178/7.3, 178/69.5, 328/111
[51] Int. Cl. ........ H04n 5/04
[50] Field of Search ........ 178/7.3S, 7.5S, 7.3E, 7.5E, 7.1E, 5.4 sync, 69.5TV; 325/472, 473, 475, 477, 65, 159, 185; 328/162, 164, 108, 165, 111, 112; 307/237, 234, 265; 329/104, 106

[56] References Cited
UNITED STATES PATENTS 2,489,297 11/1949 Labin et al. ........ 328/108
2,668,236 2/1954 McCoy ........ 328/111
3,413,412 11/1968 Townsend ........ 307/234

*Primary Examiner*—Richard Murray
*Assistant Examiner*—Alfred H. Eddleman
*Attorney*—Michael S. Striker

ABSTRACT: An electronic circuit arrangement for extracting noise-free synchronizing information from the sync signal of a television signal. The sync signal is applied to a differentiating circuit which provides spike-shaped impulses corresponding to the leading and trailing edges of the sync pulse. The leading or front edge of the pulse after differentiation is used to actuate a timing network in the form of an oscillator circuit or a delay line. The period of oscillation of the oscillator is made equal to the pulse width of the sync pulse. After the spike-impulse has been delayed for the duration of the sync pulse, it is applied to a comparison circuit which has as its second input the trailing edge of the sync pulse. If the two inputs to the comparator circuit occur at the same instant of time, an output is provided by the comparator indicating the presence of this condition. When the delay line is used the delay is made equal to the duration of the sync pulse.

Inventor:
Edmund Jauernik by
Michael J. Striker
Attorney

Inventor:
Edmund Jauernik by Michael J. Striker
Attorney

ARRANGEMENT FOR DERIVING NOISE-FREE SYNCHRONIZING INFORMATION FROM THE SYNC SIGNAL OF A TELEVISION SIGNAL

BACKGROUND OF THE INVENTION

In accordance with the present invention noise free synchronizing information is derived from the sync or synchronizing signal of a television signal. The present invention applies only to line synchronizing pulses of normal width, and provides a train of noise-free line synchronizing pulses. This train of pulses is interrupted during the appearance of the vertical synchronizing signal in the television signal including the equalizing pulses. In a preferred arrangement of the present invention, gating pulses are produced for gating in or out a color synchronizing signal in relation to a color television signal. The present invention is also applicable to the derivation of synchronizing information with vertical frequency.

In one arrangement for deriving noise-free synchronizing information from the synchronizing or sync signal of a television signal, the line sync or synchronizing pulses separated from the television signal are differentiated. A delay pulse signal is produced through means of the front or leading edge of the line synchronizing pulse and during the duration of the line synchronizing pulse. The signal produced in this manner is compared on a time basis with the trailing edge of the corresponding pulse of the line synchronizing pulses.

If the comparison on the time basis is performed in a coincidence circuit which provides an output only when its two inputs appear at the same instant of time, then such an output signal is transmitted only for every line synchronizing pulse which is of normal width, in the television signal. The pulse-shaped noise signals between the line synchronizing pulses generally have a different width from the line synchronizing pulses and, therefore, no output signal will be obtained. As a result, such noise signals will not cause false synchronizing information to become used. Accordingly, the equalizing pulses with double the frequency and half the width of the line synchronizing pulse and appearing before and after the vertical synchronizing signal, also does not cause an output signal. Thus, the noise-free train of line synchronizing pulses is interrupted during the time of the vertical synchronizing pulses including the equalizing pulses.

If the coincidence or AND circuit is replaced with an AND-NOT circuit for the purpose of performing the comparison on the basis of time, an output is realized only provided that the two pulses to be compared do not appear at the same instant of time. From such an arrangement, it is also possible to realize vertical synchronizing information wherein, however, the noise-free feature of the present invention is lost.

SUMMARY OF THE INVENTION

An arrangement for deriving noise-free synchronizing information from the sync signal of a television signal. The sync pulse is differentiated so that the leading edge and trailing edge provide spike-shaped pulses of opposite polarity. The leading or front edge of the pulse in the form of a spike impulse after differentiation, is applied to a timing circuit which may be in the form of an oscillator or a reflex delay line. The oscillator when actuated by the leading edge of the sync pulse after differentiation, has a period of oscillation corresponding to the duration of the sync pulse before differentiation. If a dual reflex delay circuit is used, the spike-shaped pulse corresponding to the leading or front edge of the sync pulse becomes delayed for the duration or pulse width of the sync pulse. The output of the oscillating circuit or delay circuit is applied to a comparator which compares this output with the trailing edge of the sync pulse. The comparator may be in the form of a gate circuit designed as an AND gate which produces an output signal when the two inputs are applied simultaneously and at the same instant of time.

The novel features which are considered as characteristic for the invention are set forth in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
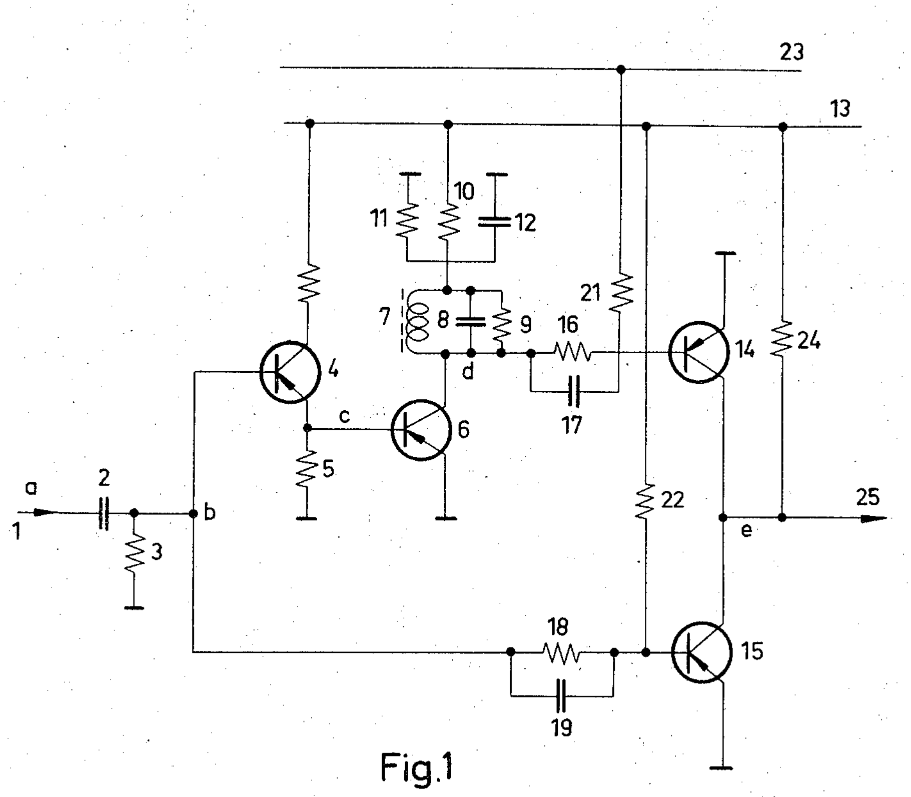
FIG. 1 is an electrical schematic diagram of an embodiment of the present invention in which an oscillator is used to delay the leading edge of the sync pulse so as to derive noise-free synchronizing information.
Figure 2:
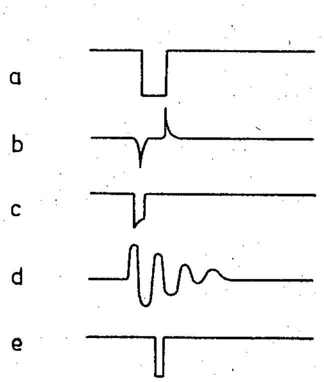
FIG. 2 shows the wave forms of the signals which prevail at various circuit locations in the embodiment of FIG. 1.

Referring to the drawing, and in particular to FIG. 1, a synchronizing signal (S) separated from a television signal is applied to the input 1. This input signal is differentiated through an RC network having a small time constant. The RC network consists of a capacitor 2 and a resistor 3. In FIG. 2 the wave form labeled *a* shows the shape of the pulse signal applied to the input 1. The wave form marked *b* in FIG. 2 shows the shape characteristics of the input signal after differentiation by the RC network, and is the signal prevailing at the circuit location *b* in FIG. 1. The front and trailing edges of the line synchronizing pulse at the circuit location *a* appears as narrow shaped spike signals of different polarity after the differentiation corresponding to the circuit location *b*. The spike signal corresponding to the front edge of the pulse and in negative direction, for example, becomes filtered out through the transistor 4 serving as an impedance transformer. The resulting filtered out spike signal appears at the emitter of the transistor 4 and is applied to the base of a further transistor 6. The wave form of the spike signal at the emitter of transistor 4 or base of transistor 6 corresponds to the circuit location *c* and is shown in the wave form diagram marked *c* in FIG. 2. The collector of the transistor 6 is connected to an oscillating circuit consisting of an inductance coil 7 connected in parallel with a capacitor 8. A resistor 9 serves to dampen the oscillations. The resistor 9 is connected in parallel with both the inductance coil 7 and capacitor 8. A voltage divider consisting of resistors 10 and 11 as well as a capacitor 12, provides the transistor 6 with the required voltage supply in relation to the line voltage 13, which may for example correspond to −12 volts.

The period of oscillation of the oscillating circuit 7—8, is the same as the duration of the line synchronizing pulse shown by the wave form *a* in FIG. 2. By adjusting or setting the resistor 9 to a predetermined value, the damping of the oscillator circuit may be established so that the oscillations appearing at the collector of the transistor 6 are decayed after the elapse of several periods. The resulting decaying wave form is shown at *d* in FIG. 2. The oscillation which at the beginning is positive going and reaches its positive peak, will attain another positive peak after the elapse of the duration corresponding to the duration of the line synchronizing pulse. This second positive peak is attained at the same time and coincides with the appearance of the spike signal corresponding to the trailing edge of the line synchronizing pulse.

The oscillations resulting from the activated oscillating circuit, and the trailing edge signal corresponding to the synchronizing pulse are applied to both inputs of a gate circuit. The latter is designed in the form of an AND gate which provides an output only when both inputs appear simultaneously. The gate circuit consists of two transistors 14 and 15. The oscillating signal is applied to the base of the transistor 14 by way of a coupling network consisting of the resistors 16 having a capacitor 17 connected in parallel with it. The positive spike signal corresponding to the trailing edge of the synchronizing pulse and illustrated by wave forms *b* of FIG. 2 is applied to the base of the second transistor 15, by way of the coupling network consisting of resistor 18 in parallel with a capacitor 19. The base of the transistor 14 leads through the resistor 21, to the positive power supply line 23 which may, for example, correspond to +12 volts. The base of the second transistor 15 is similarly connected to the power supply line 13 by way of the resistor 22. The power supply line 13 is of negative polarity. The collectors of transistors 14 and 15 are joined together, and are connected to the power supply line 13 through the resistor 24. As a result of the circuit connections, current passes through the resistor 24 only when both transistors have a signal applied to them simultaneously and at the same instant of time. The voltage drop across the resistor 24 provides the pulse shape output signal at the output terminal 25, which is shown by the wave form *e* in FIG. 2.

The numerical values of the components used in the circuit of FIG. 1 are as follows:

| | | |
|---|---|---|
| Resistors: | | |
| 3 | kΩ | 1 |
| 5 | kΩ | 1 |
| 10 | kΩ | 5, 6 |
| 11 | kΩ | 3 |
| 9 | kΩ | 18 |
| 16 | kΩ | 18 |
| 2 | kΩ | 2 |
| 21 | kΩ | 27 |
| 22 | kΩ | 16 |
| 24 | kΩ | 1 |
| Capacitors: | | |
| 2 | pf | 150 |
| 8 | pf | 500 |
| 12 | μf | 2 |
| 17 | pf | 470 |
| 19 | pf | 150 |
| Transistors: | | |
| 4 | | 2N3906 |
| 6 | | 2N3906 |
| 14 | | 2N3906 |
| 15 | | 2N3906 |

In a preferred application of the present invention, a gate pulse is produced for gating in or out of the color synchronizing signal of a color television signal. In such an arrangement the output pulse at the output terminal 25 is used for the purpose of controlling a pulse generator. The latter, not shown, provides pulses of corresponding period and phase relationship. As required in this application, these pulses prevail only in association with each line synchronizing pulse, and at the instant of time of the vertical synchronizing pulse including the equalizing pulse. Accordingly, these pulses are not present during the time interval of the vertical blanking.

To produce from the front or leading edge of the line synchronizing pulse a delayed narrow pulse corresponding to the width of the line synchronizing pulse, it is possible to use a circuit other than the damped oscillating circuit shown in FIG. 1. As an example of another one such circuit, a reflex delay line may be used. The differentiated leading edge of the line synchronizing pulse would be applied to the input of such a reflex delay line. At the instant of time that the trailing edge of the line synchronizing pulse appears, this pulse is returned to the input. As a result, this pulse may be compared with the one derived from the trailing edge of the applied pulse.

Figure 3:
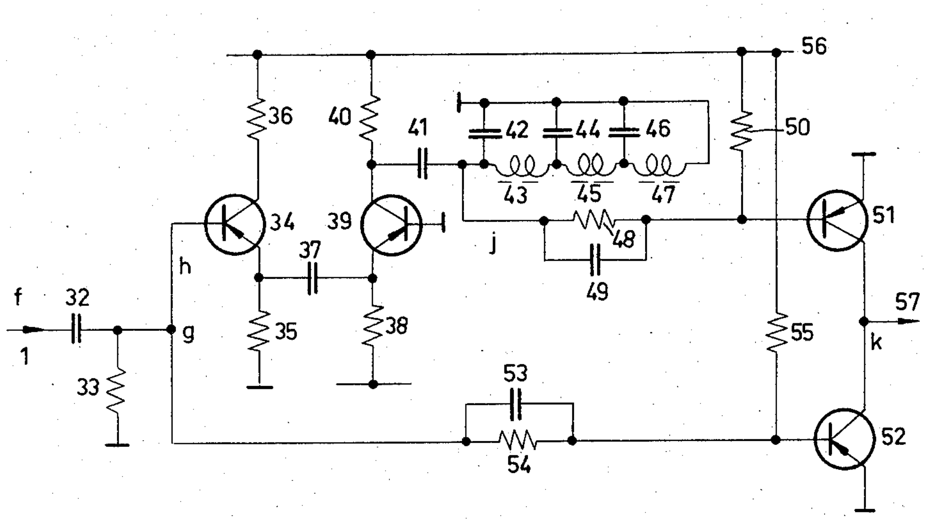
FIG. 3 is an electrical schematic diagram of another embodiment of the present invention using a delay line in place of the oscillator in FIG. 1.
Figure 4:
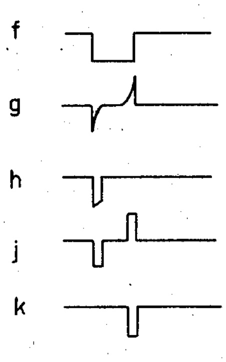
FIG. 4 shows the wave forms of the signals which prevail at various circuit locations in the embodiment of FIG. 3.

FIG. 3 shows a circuit arrangement which uses in accordance with the present invention a reflex circuit involving a delay line for the purpose of delaying the pulses. In a manner similar to that described in relation to FIG. 1, the applied synchronizing signal (S) is applied to the input terminal 1 and differentiated by an RC network consisting of a resistor 33 and capacitor 32. The pulse applied to the input terminal 1 is shown by the wave form labeled *f* in FIG. 4. After differentiation the wave form appears as that marked *g* in FIG. 4. Thus, narrow spike pulses are derived from the leading and trailing edges of the synchronizing pulse. The differentiated spike pulses are applied, on one hand, to the base of a transistor 34 and on the other hand, to the base of a transistor 52 of the gate circuit. A coupling network consisting of a capacitor 53 and resistor 54 is connected between the circuit point *g* and the base of the transistor 52.

The signal appearing at the emitter-resistor 35 of the transistor 34, is applied by way of the capacitor 37 to the emitter of a further transistor 39. The amplified signal from the collector resistor 40 of the grounded base transistor 39, is taken and applied through the capacitor 41 to the reflex delay line. The latter includes three series-connected inductances 43, 45 and 47. Capacitors 42, 44 and 46 are connected to the junction points of the inductances. The time delay associated with this delay line in the reflex circuit is such that the time interval required in the forward and return directions, is approximately 4.5 microseconds. Thus, a signal applied to the input of the delay line, will transverse the delay line and after reflection return to the input terminal during a time interval of approximately 4.5 microseconds. The signal returning after this period of time through the delay line, is applied through the RC network consisting of resistor 48 and capacitor 49, to the base of transistor 51. This transistor 51 is the second transistor of the gate circuit. The gate circuit provides an output at its output terminal 57, therefore, when the reflected pulse signal coincides in time with the trailing edge of the synchronizing pulse.

The values of the components used in the circuit arrangement of FIG. 3 are as follows:

| | | |
|---|---|---|
| Resistors: | | |
| 33 | ohm | 1K |
| 35 | ohm | 1K |
| 36 | ohm | 100 |
| 38 | ohm | 5. 6K |
| 40 | ohm | 2. 7K |
| 48 | ohm | 2. 7K |
| 50 | ohm | 3. 9K |
| 54 | ohm | 2. 2K |
| Capacitors: | | |
| 32 | pf | 150 |
| 37 | μf | 1 |
| 41 | μf | 50, 000 |
| 49 | pf | 470 |
| 53 | pf | 220 |
| Transistors: | | |
| 34 | | 2N3906 |
| 39 | | 2N3906 |
| 51 | | 2N3906 |
| 52 | | 2N3906 |

As already mentioned, the arrangement in accordance with the present invention can also be used for the purpose of achieving vertical synchronization. This is accomplished through the use of an AND-NOT circuit in place of the coincidence or AND circuit. Such a resulting circuit would then provide an output only if both pulses do not appear at the same instant of time.

It will be understood that each of the elements described above, or two or more together, may also find a useful application in other types of synchronizing information circuits for television signals, differing from the types described above.

While the invention has been illustrated and described as embodied in synchronizing information circuits for television signals, it is not intended to be limited to the details shown since various modifications and structural changes may be made without departing in any way from the spirit of the present invention.

Without further analysis, the foregoing will so fully reveal the gist of the present invention that other can by applying current knowledge readily adapt it for various applications without omitting features that from the standpoint of prior art, fairly constitute essential characteristics of the generic or specific aspects of this invention and, therefore, such adaptations should and are intended to be comprehended within the meaning and range of equivalence of the following claims.

I claim:

1. An arrangement for deriving noise-free synchronizing information from the sync signal of a television signal, comprising, in combination, a resistor-capacitor network for differentiating the line sync pulse separated from said television signal and generating thereby a spike-shaped pulse corresponding to the leading edge of said line sync pulse; oscillator means with an inductor connected in parallel with a capacitor and actuated by the leading edge of said sync pulse and having a period of oscillation equal to that of the pulse duration of said sync pulse, said oscillator means being timing means for delaying said spike-shaped pulse by the duration of said line sync pulse; AND-gate with two transistors, the base of one transistor being connected to the output of said oscillating means and the base of the other one of said two transistors being connected to the output of said resistance-capacitance network, said AND-gate providing an output signal when said spike-shaped pulse in said trailing edge of said sync pulse are applied to the inputs of said AND-gate simultaneously and at the same instant of time, so that said AND-gate compares on a time basis the trailing edge of said sync pulse with said spike-shaped pulse after having been delayed by said oscillating means; and transistor means connected between said resistance-capacitance network and said oscillating means for impedance conversion and applying said spike-shaped pulse to said oscillator means.

2. The arrangement for deriving noise-free synchronizing information from the sync signal of a television signal as defined in claim 1 wherein said oscillator means includes delay line means comprised of inductor and capacitor elements.